Figures 5, 6:
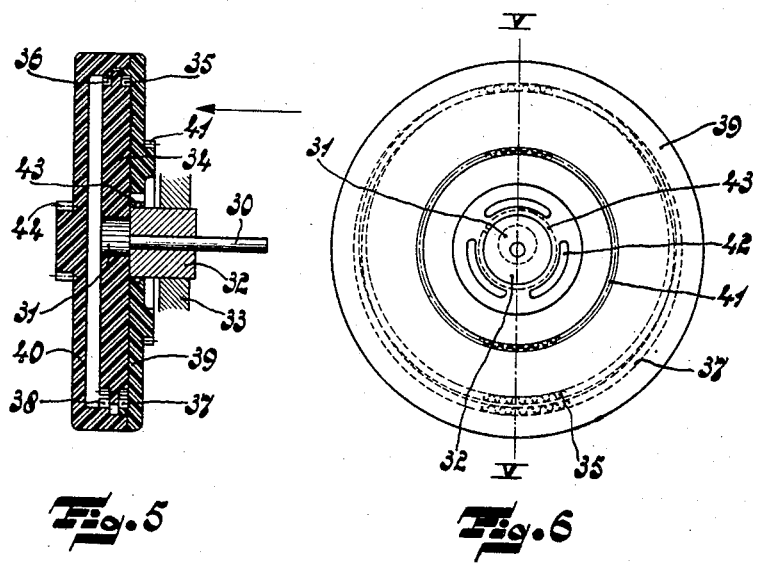

April 1, 1958  A. H. BOERDIJK ET AL  2,828,649
PLANETARY GEAR
Filed Oct. 27, 1954  2 Sheets-Sheet 1
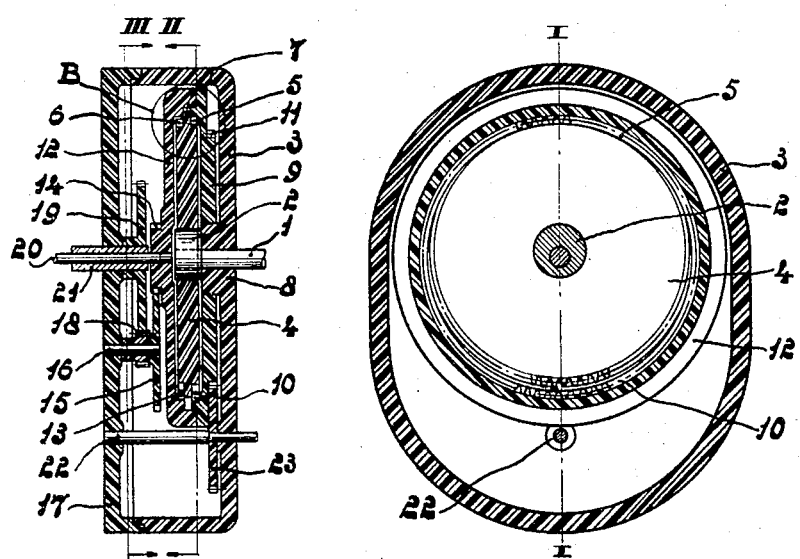
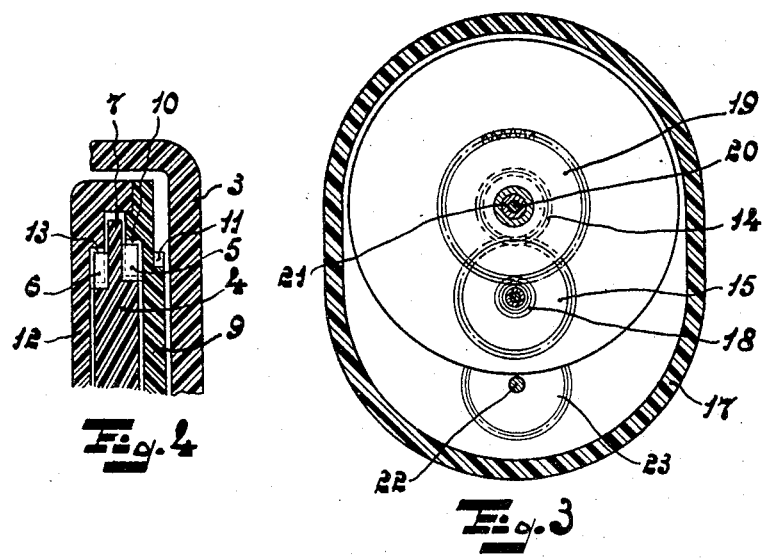
INVENTORS
ARIE HENDRIK BOERDIJK
PAUL EMIL FRITZ KASSNER
ANDRE DAVIDSON
BY
AGENT April 1, 1958   A. H. BOERDIJK ET AL   2,828,649
PLANETARY GEAR Filed Oct. 27, 1954   2 Sheets-Sheet 2

INVENTORS
ARIE HENDRIK BOERDIJK
PAUL EMIL FRITZ KASSNER
ANDRE DAVIDSON
BY
AGENT

United States Patent Office 2,828,649
Patented Apr. 1, 1958

2,828,649
PLANETARY GEAR

Arie Hendrik Boerdijk, Paul Emil Fritz Kassner, and André Davidson, Eindhoven, Netherlands, assignors, by mesne assignments, to North American Philips Company, Inc., New York, N. Y., a corporation of Delaware Application October 27, 1954, Serial No. 464,982

Claims priority, application Netherlands November 13, 1953

3 Claims. (Cl. 74—675)

Planetary gears are known comprising an input shaft, a housing and an output shaft, in which the input shaft has an eccentric secured to it about which two rigidly intercoupled gear-wheels are adapted to rotate the numbers of teeth of which are slightly different from one another, the first gear-wheel cooperating with first internal teeth formed on the housing and arranged so as to be concentric with the input shaft, while the second gear-wheel cooperates with second internal teeth formed on a member coupled to the output shaft and arranged so as to be concentric with the output shaft. Such a planetary gear train has the advantage that it permits of a large gear ratio between the input shaft and the output shaft. However, it may be required to cause the output shaft of such a planetary gear to rotate independently of the input shaft.

The invention enables this requirement to be satisfied and as characterized in that in a planetary gear of the above-mentioned kind the first internal teeth are adapted to rotate relatively to the input shaft and independently thereof. Thus, the two gear-wheels adapted to rotate about the eccentric can be caused to effect an additional rotation independent of the movement of the input shaft so that a movement of the second internal teeth is obtained which is superposed on the original movement.

The rotation of the said first internal teeth independent of the input shaft may be ensured in various ways. In a preferred embodiment of the invention the first internal teeth are formed on a member which is coupled by friction to the stationary housing in a manner such that these internal teeth may be caused to rotate independently of the housing. Normally the said member is stationary; only if this member has a moment imparted to it such that the friction between this member and the housing is overcome, the member will be able to rotate.

According to a further embodiment of the invention the first internal teeth are rigidly secured to a part of the housing which is stationary during normal operation and this housing is coupled to a stationary bearing supporting the housing and the input shaft by means of a friction coupling.

It is particularly advantageous if, according to an alternative embodiment of the invention, the housing and/or, the gear wheels are made of a thermosetting or a thermoplastic synthetic resin, such as a linear polyamide (nylon, Akulon, etc.). This enables the internal teeth and the gear-wheels to be used without additional machining with the result that manufacture is cheap. If the housing is made of a thermosetting synthetic resin this resin may be mixed with a solid lubricant, such as graphite. If a linear polyamide is used as the material for the housing and gear wheels, no lubrication is required.

The planetary gear according to the invention is particularly suitable for use in combination with an electric synchronous motor. With suitable arrangement of the number of revolutions of the motor shaft combined with the gear an assembly is obtainable which constitutes a clock movement in which the minute hand or seconds hand is directly driven by the output shaft of the gear while due to the independent rotation of the first internal teeth the hands may be adjusted. In this case an additional transmission between the shafts of the hour hand and the minute hand must be provided but this may be incorporated in the housing so that a compact assembly is obtained from which dust is also entirely excluded.

The invention will now be described with reference to the accompanying drawing, in which two embodiments thereof are shown by way of example, and in which—

Fig. 1 is a cross-sectional view of a planetary gear according to the invention taken along the line I—I of Fig. 2, Fig. 2 is a cross-sectional view of the embodiment shown in Fig. 1 taken along the line II—II viewed in the direction of the arrows, Fig. 3 is a cross-sectional view taken along the line III—III of Fig. 1 and also viewed in the direction of the arrows, Fig. 4 shows on an enlarged scale the part of Fig. 1 designated B and surrounded by a circle, Fig. 5 is a cross-sectional view of an alternative embodiment of a planetary gear taken along the line V—V of Fig. 6 and Fig. 6 is a front elevation of the embodiment shown in Fig. 5 viewed in the direction of the arrows.

In Fig. 1 an input shaft 1 carries an eccentric 2. The input shaft 1 is journalled in a housing 3. A member 4 comprising two toothed rims 5 and 6 and an interposed annular member 7 is adapted to rotate about the eccentric 2. A shoulder 8 formed on the housing 3 is surrounded by an annular member 9 comprising internal teeth 10 and external teeth 11. In addition, provision is made of a member 12 comprising internal teeth 13 and external teeth 14. The said external teeth 14 cooperate with a gear-wheel 15 which by means of a shaft 16 journalled in a housing part 17 and a gear-wheel 18 drives a further gear-wheel 19; an output shaft 20 is rigidly secured in the member 12, while the gear-wheel 19 drives an output shaft 21. Finally provision is made of a shaft 22 on which a gear-wheel 23 is mounted which co-operated with the external teeth 11 of the annular member 9. The toothed rim 5 is slightly larger than the toothed rim 6 and also comprises at least one tooth more than the rim 6. Accordingly, the internal toothing 10 is slightly larger than the internal toothing 13 and comprises a few teeth more than the toothing 13. In normal operation the member 4 will swing about the centre line of the shaft 1 due to the rotation of the said shaft 1 together with the eccentric 2. Since the housing and the annular member 9 comprising the internal teeth 10 are normally stationary, the member 12 will be caused to rotate. In accordance with the differences in the number of teeth between 5 and 6 the member 12 will rotate, for example, 10,000 times more slowly than the shaft 1 with the result that the shaft 20 secured to the member 12 will rotate at the same reduced speed relatively to the shaft 1. Due to the provision of the gearing between the member 12 and the shaft 21, this shaft will rotate at an even more reduced speed. The shaft 20 may, for example, carry the minute hand and the shaft 21 the hour hand of a clock, the shaft 1 in this case being driven by an electric synchronous motor. Since the annular member 9 is only held to the shoulder 8 by friction, rotation of the shaft 22 and the gear wheel 23 mounted thereon which engages the toothed rim 11 formed on the annular member 9 enables this member to be rotated irrespective of the rotation of the shaft 1. Consequently, the normal rotation of the shaft 20 has a second rotation superposed on it which largely exceeds this normal rotation, thus enabling the minute hand mounted on this shaft and the hour hand mounted on the shaft 21 to be adjusted by hand, Preferably not only the housing parts 3 and 17 but also all the gear-wheels are made of a thermosetting or thermoplastic synthetic resin; in the first case the synthetic resin may have graphite mixed with it so that no lubrication is required, since this graphite ensured the lubrication. In the second case a linear polyamide is advantageously used as the synthetic resin, thus eliminating the need for lubrication. In both cases the two housing parts may be cemented together with the result that a compact assembly is obtained from which dust is excluded in an optimum manner.

In one embodiment of the planetary gear in combination with an electric synchronous motor the motor comprised 18 pole pairs so that with a mains frequency of 50 C./S. the number of revolutions of the motor shaft was 10,000 per hour. The number of teeth of the toothed rims 5 and 6 was 100 and 99 respectively and the pitch circle of these rims was 41 and 40 mms. respectively. The number of internal teeth 10 and 13 was 101 and 100 respectively and their pitch circles were approximately 2 mms. larger than the corresponding pitch circles of the toothed rims 5 and 6. The eccentric 2 exhibited an eccentricity of approximately 0.5 mm. The speed of the shaft 20 was exactly one revolution per hour.

In Fig. 5 an input shaft 30 carries an eccentric 31. The shaft 30 is journalled in a member 32 which is supported in a stationary bearing 33. Here also a member 34 which similarly to the member 4 shown in Fig. 1 comprises two toothed rims 35 and 36 comprising different numbers of teeth and of different diameters which cooperate with internal teeth 37 and 38 respectively formed on two housing parts 39 and 40, is adapted to rotate about the eccentric 31. In addition, the housing part 39 comprises external teeth 41 and it is arranged on the member 32 so as to grip this member. This gripping is produced in that the housing 39 is made of Akulon and comprises three slots 42 and has a steel wire 43 pressed therein. The housing part 40 comprises external teeth 44. This housing part 40 comprising the external teeth 44 acts as the output shaft of the gear, the rotation of the housing part 40 which is independent of the rotation of the shaft 30 being produced by rotation of the housing part 41 relatively to the member 32. In the embodiment shown in Figs. 5 and 6 the housing parts consequently can not be rigidly secured to one another.

The gears described are adapted to transmit a power of approximately 2 watts; generally the maximum power which may be transmitted by such a gear is approximately 10 watts.

What is claimed is:

1. A planetary gear arrangement comprising a housing, an input shaft and an output shaft in said housing, an eccentric coupled to said input shaft, a pair of rigidly intercoupled gear wheels, one gear wheel having a slightly different number of teeth than said other gear wheel, a first member having a first set of internal teeth therein arranged concentric with said input shaft and a first set of external teeth thereon, a second member having a second set of internal teeth therein arranged concentric with said output shaft, one of said gear wheels co-acting with said first set of teeth and the other of said gear wheels co-acting with said second set of teeth, and means rotating said first set of teeth relatively to the input shaft and independently of the latter, said first member being frictionally coupled to said housing, a shaft journalled in said housing, and a gear wheel mounted on said shaft, said gear wheel meshing with said first set of external teeth to permit the output shaft to be rotated manually.

2. A planetary gear arrangement as set forth in claim 1 wherein said first set of internal teeth is rotated independently of said housing.

3. A planetary gear arrangement as set forth in claim 1 further comprising a stationary bearing, said first set of internal teeth being secured to a part of said housing, and the latter being frictionally coupled to said stationary bearing.

References Cited in the file of this patent

UNITED STATES PATENTS

| 1,050,564 | French | Sept. 2, 1953 |
| 1,615,664 | Warren | Jan. 25, 1927 |
| 2,167,677 | Petersen | Aug. 1, 1939 |
| 2,303,365 | Karlsen | Dec. 1, 1942 |
| 2,699,656 | Anderson et al. | Jan. 18, 1955 |

FOREIGN PATENTS

| 849,434 | France | Apr. 11, 1939 |
| 609,562 | Great Britain | Oct. 4, 1948 |

OTHER REFERENCES

Product Engineering, September 1948, pp. 140, 141.